US012348945B2

(12) United States Patent
Nakatani et al.

(10) Patent No.: US 12,348,945 B2
(45) Date of Patent: Jul. 1, 2025

(54) ACOUSTIC SIGNAL ENHANCEMENT APPARATUS, METHOD AND PROGRAM

(71) Applicant: NIPPON TELEGRAPH AND TELEPHONE CORPORATION, Tokyo (JP)

(72) Inventors: Tomohiro Nakatani, Tokyo (JP); Rintaro Ikeshita, Tokyo (JP); Keisuke Kinoshita, Tokyo (JP); Hiroshi Sawada, Tokyo (JP); Shoko Araki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 168 days.

(21) Appl. No.: 18/030,981

(22) PCT Filed: Oct. 15, 2020

(86) PCT No.: PCT/JP2020/038930
§ 371 (c)(1),
(2) Date: Apr. 7, 2023

(87) PCT Pub. No.: WO2022/079854
PCT Pub. Date: Apr. 21, 2022

(65) Prior Publication Data

US 2023/0370778 A1 Nov. 16, 2023

(51) Int. Cl.
*H04R 5/04* (2006.01)
*G10L 21/0208* (2013.01)
(Continued)

(52) U.S. Cl.
CPC ............ *H04R 5/04* (2013.01); *G10L 21/0208* (2013.01); *G10L 21/0272* (2013.01); *H04R 3/04* (2013.01); *G10L 2021/02082* (2013.01)

(58) Field of Classification Search
None
See application file for complete search history.

(56) References Cited

U.S. PATENT DOCUMENTS

2013/0294611 A1* 11/2013 Yoo ........................ G10L 21/028 381/66
2019/0318757 A1* 10/2019 Chen ...................... G10L 19/022
2020/0152222 A1* 5/2020 Baque ................. G10L 21/0272

OTHER PUBLICATIONS

Nakatani et al. (2020) "Jointly Optimal Denoising, Dereverberation, and Source Separation", IEEE/ACM Transaction on Audio, Speech, and Language Processing, Jul. 31, 2020., vol. 28, pp. 2267-2282.
(Continued)

*Primary Examiner* — Paul W Huber

(57) ABSTRACT

Provided is an acoustic signal enhancement device, including a time-space covariance matrix estimation unit configured to estimate a time-space covariance matrix corresponding to a sound source, using a power of the sound source and an observation signal vector composed of an observation signal from a microphone. A reverberation suppression unit is configured to obtain a reverberation removal filter of the sound source using the time-space covariance matrix, and to generate a reverberation suppression signal vector corresponding to the observation signal for an emphasized sound of the sound source using the reverberation removal filter and the observation signal vector. A sound source separation unit is configured to obtain an emphatic sound of the sound source and the power of the sound source using the reverberation suppression signal vector.

3 Claims, 5 Drawing Sheets

(51) Int. Cl.
*G10L 21/0272* (2013.01)
*H04R 3/04* (2006.01)

(56) References Cited

OTHER PUBLICATIONS

Hori et al. (2011) "Low-latency real-time meeting recognition and understanding using distant microphones and omni-directional camera", IEEE Trans. Audio, Speech, and Language Processing, vol. 20, No. 2, pp. 499-513.
Yoshioka et al. (2010) "Blind separation and dereverberation of speech mixtures by joint optimization", IEEE Trans. Audio, Speech, and Language Processing, vol. 19, No. 1, pp. 69-84.

* cited by examiner

ACOUSTIC SIGNAL ENHANCEMENT APPARATUS, METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/038930, filed on 15 Oct. 2020, the disclosure of which is hereby incorporated herein by reference in its entirety.

TECHNICAL FIELD

The present invention relates to an acoustic signal enhancement technology for separating an acoustic signal, in which a plurality of sounds and reverberations thereof collected by a plurality of microphones are mixed, into individual sounds without previous information on each of sound components, while simultaneously suppressing reverberation.

BACKGROUND ART

A conventional method 1 of the acoustic signal enhancement technology includes a reverberation suppression step of simultaneously suppressing reverberation related to all sound components without previous information on each sound component, and a sound source separation step of separating mixed sounds after the reverberation suppression into individual sounds. A configuration of the conventional method 1 is illustrated in FIG. 4.

A conventional method 2 of the acoustic signal enhancement technology includes the same processing steps as those of the conventional method 1. However, in the conventional method 2, the optimum processing can be performed by repeating the steps of feeding back the sound source separation results to the reverberation suppression step and processing each block again. A configuration of the conventional method 2 is illustrated in FIG. 5.

CITATION LIST

Non Patent Literature

[NPL 1] Takaaki Hori, Shoko Araki, Takuya Yoshioka, Masakiyo Fujimoto, Shinji Watanabe, Takanobu Oba, Atsunori Ogawa, Kazuhiro Otsuka, Dan Mikami, Keisuke Kinoshita, Tomohiro Nakatani, Atsushi Nakamura, Junji Yamato, "Low-latency real-time meeting recognition and understanding using distant microphones and omni-directional camera", IEEE Trans. Audio, Speech, and Language Processing, vol. 20, No. 2, pp. 499-513, 2011.

[NPL 2] Takuya Yoshioka, Tomohiro Nakatani, Masato Miyoshi, Hiroshi G Okuno, "Blind separation and dereverberation of speech mixtures by joint optimization", IEEE Trans. Audio, Speech, and Language Processing, vol. 19, No. 1, pp. 69-84, 2010.

SUMMARY OF INVENTION

Technical Problem

However, in the conventional method 1, since the reverberation suppression step is performed independently of processing performed in the sound source separation step to be executed subsequently, the reverberation suppression and the sound source separation are performed at the same time, whereby the optimum processing cannot be achieved.

In the conventional method 2, generally optimum processing is possible, however it is necessary to obtain a matrix of a sufficiently large size for all sound sources, all microphones and all filter coefficients and to calculate its inverse matrix for estimating the reverberation suppression again when the sound source separation results are fed back. Therefore, a large calculation cost is incurred.

An object of the present invention is to provide an acoustic signal enhancement device, a method and a program, each of which can achieve calculation costs lower than those of the conventional methods.

Solution to Problem

An acoustic signal enhancement device according to one aspect of the present invention includes:

- a time-space covariance matrix estimation unit configured to estimate a time-space covariance matrix $R_f^{(n)}, P_f^{(n)}$ corresponding to a sound source n, using a power $\lambda_{t,f}^{(n)}$ of the sound source n and an observation signal vector $X_{t,f}$ composed of an observation signal $x_{m,t,f}$ from a microphone m, wherein t denotes a time frame number, f denotes a frequency number, N denotes the number of sound sources, M denotes the number of microphones, n is any number from 1 to N, and m is any number from 1 to M;
- a reverberation suppression unit configured to obtain a reverberation removal filter $G_f^{(n)}$ of the sound source n using the estimated time-space covariance matrix $R_f^{(n)}$, $P_f^{(n)}$, and to generate a reverberation suppression signal vector $Z_{t,f}^{(n)}$ corresponding to the observation signal $x_{m,t,f}$ for an emphasized sound of the sound source n using the obtained reverberation removal filter $G_f^{(n)}$ and the observation signal vector $X_{t,f}$;
- a sound source separation step configured to obtain an emphatic sound $y_{t,f}^{(n)}$ of the sound source n and the power $\lambda_{t,f}^{(n)}$ of the sound source n using the generated reverberation suppression signal vector $Z_{t,f}^{(n)}$; and
- a control unit configured to control repeated processing of the time-space covariance matrix estimation unit, the reverberation suppression unit, and the sound source separation unit.

Advantageous Effects of Invention

Different from the conventional method 1, the optimum processing can be achieved by repeated processing. Since it is not necessary to consider a relationship among sound sources in the reverberation removal of the present invention, a size of a matrix necessary for optimization can be greatly reduced as compared with the conventional method 2. Therefore, the total calculation cost can be reduced.

DESCRIPTION OF EMBODIMENTS

Figure 1:
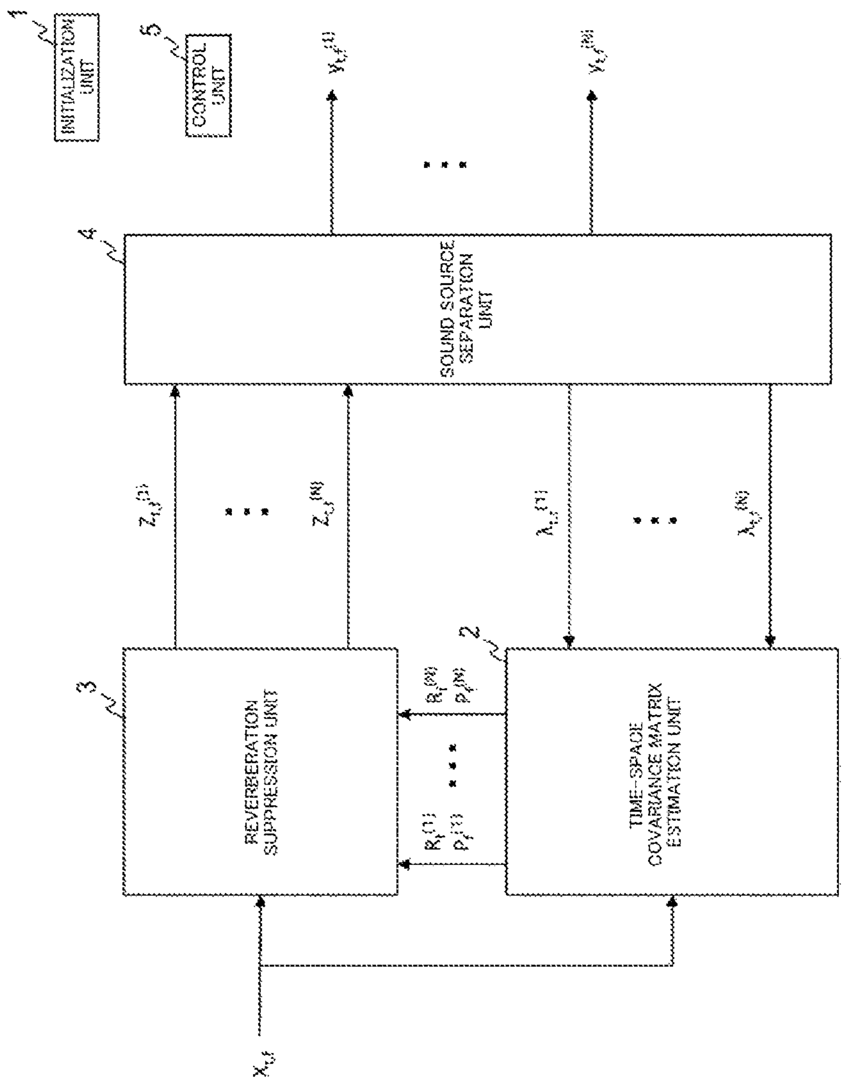
FIG. 1 is a diagram illustrating an example of a functional configuration of an acoustic signal enhancement device.

Embodiments of the present invention will be described hereinafter in detail. Further, components with the same function are denoted by the same reference numerals in the diagrams, and redundant description will be omitted accordingly.

[Acoustic Signal Enhancement Device and Method]

As shown in FIG. 1, the acoustic signal enhancement device includes an initialization unit 1, a time-space covariance matrix estimation unit 2, a reverberation suppression unit 3, a sound source separation unit 4 and a control unit 5, for example.

Figure 2:
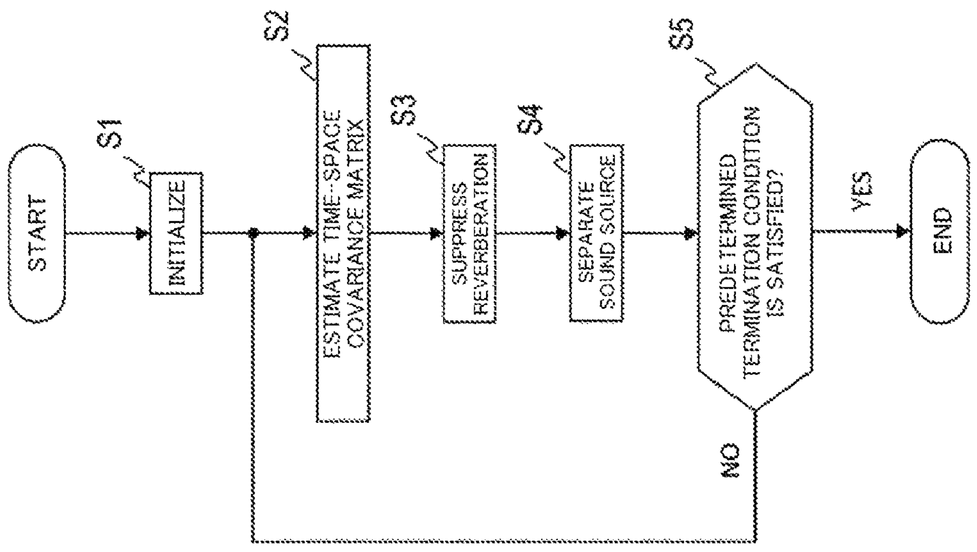
FIG. 2 is a diagram illustrating an example of a processing procedure of an acoustic signal enhancement method.

An acoustic signal enhancement method is implemented, for example, by causing each constituent unit of the acoustic signal enhancement device to execute processing from step S1 to step S5 shown in FIG. 2 to be described below.

A symbol "-" used in the following description should be denoted immediately above a character following the symbol, but it is herein denoted immediately in front of the character due to the limitation of text notation. These symbols are written at positions where they should have been, that is, right above the characters. For example, "$^{-}$X" in the description will be displayed in the equation as follows:

$$\overline{X} \quad \text{[Math. 1]}$$

First, usage of symbols will be described hereinbelow.

M is the number of microphones, and m ($1 \le m \le M$) is a microphone number. M is a positive integer equal to or greater than 2.

N is the number of sound sources, and n ($1 \le n \le N$) is a sound source number. Note that the sound source number is represented by an upper right subscript. For example, it is represented as $^{-}w^{(n)}$. N is a positive integer equal to or greater than 2.

t and τ ($1 \le t, \tau \le T$) are time frame numbers. T is the total number of time frames, and is a positive integer of 2 or more.

f ($1 \le f \le F$) is a frequency number. The sound source is represented by an upper right subscript, and the microphone, time and frequency are represented by lower right subscripts. For example, it is represented by $z_{m,t,f}^{(n)}$. F is a frequency corresponding to the highest frequency bin.

$(\bullet)^T$ denotes a non-conjugate transpose of a matrix or vector, and $(\bullet)^H$ denotes a conjugate transpose a matrix or vector. • indicates any matrix or vector.

Lowercase letters are scalar variables. For example, an observation signal $x_{m,t,f}$ for a microphone m is a scalar variable wherein t denotes a time and f denotes a frequency.

Uppercase letters represent vectors or matrices. For example, $X_{t,f}=[x_{1,t,f}, x_{2,t,f}, \ldots, x_{M,t,f}]^T \in C^{M\times 1}$ is an observation signal vector for all microphones wherein t denotes a time and f denotes a frequency.

$C^{M\times N}$ indicates the entire set of M×N-dimensional complex matrices. $X \in C^{M\times N}$ is a notation indicating that it is an element of the matrix. That is, it indicates X is an element of $C^{M\times N}$.

$\lambda_{t,f}^{(n)}$ is a power of the sound source n at the time t and the frequency f, which is a scalar.

$y_{t,f}^{(n)}$ is an emphatic sound of the sound source n at the time t and the frequency f, which is a scalar.

$G_f^{(n)} \in C^{M(L-D)\times M}$ is a reverberation removal filter for the sound source n at the frequency f. L is a filter order and is a positive integer of 2 or more. D is an expected delay and is a positive integer of 1 or more.

$W_f=[Q_f^{(1)}, Q_f^{(2)}, \ldots, Q_f^{(N)}]^T \in C^{M\times N}$ is a separation matrix for the frequency f, and $Q_f^{(n)}$ is a separation filter for the sound source n at the frequency f.

$R_f^{(n)} \in C^{M(L-D)\times M(L-D)}$, $P_f^{(n)} \in C^{M(L-D)\times M}$ is a time-space covariance matrix for each sound source at the frequency f.

Each constituent unit of the acoustic signal enhancement device will be described below.

<Initialization Unit 1>

When n is any number from 1 to N, the initialization unit 1 initializes a power $\lambda_{t,f}^{(n)}$ and a separation matrix $W_f=[Q_f^{(1)}, Q_f^{(2)}, \ldots, Q_f^{(N)}]^T \in C^{M\times N}$ for each sound source n.

The initialized power $\lambda_{t,f}^{(n)}$ for the sound source n is output to the time-space covariance matrix estimation unit 2. The initialized separation matrix $W_f$ is output to the sound source separation unit 4. The initialized power $\lambda_{t,f}^{(n)}$ for the sound source n may be output to the sound source separation unit 4, if needed.

The initialization unit 1 initializes the power $\lambda_{t,f}^{(n)}$ and the separation matrix $W_f$ for the sound source n. For example, the initialization unit 1 initializes the variables with a separation filter $Q_f^{(n)}$ of the sound source n as an identity matrix, and with the power $\lambda_{t,f}^{(n)}$ of the sound source n as a power of the observation signal $x_{n,t,f}$. The initialization unit 1 may initialize these variables by another method.

<Time-Space Covariance Matrix Estimation Unit 2>

The power $\lambda_{t,f}^{(n)}$ of the sound source n, which has been initialized by the initialization unit 1 or updated by the sound source separation unit 4, and an observation signal vector $X_{t,f}$ composed of the observation signal $x_{m,t,f}$ from the microphone m are input to the time-space covariance matrix estimation unit 2.

When n is any number from 1 to N, the time-space covariance matrix estimation unit 2 estimates a time-space covariance matrix $R_f^{(n)},P_f^{(n)}$ corresponding to the sound source n, using the power $\lambda_{t,f}^{(n)}$ of the sound source n and the observation signal vector $X_{t,f}$ composed of the observation signal $x_{m,t,f}$ from the microphone m (step S2).

That is, the time-space covariance matrix estimation unit 2 estimates time-space covariance matrices $R_f^{(1)},P_f^{(1)}, \ldots, R_f^{(N)},P_f^{(N)}$ corresponding to the sound sources 1, . . . , N, respectively. Unlike the conventional method 2, it is possible to achieve a lower calculation cost as compared to the conventional method 2 by estimating the time-space covariance matrix $R_f^{(n)},P_f^{(n)}$ for each of sound sources 1, . . . , N.

The estimated time-space covariance matrix $R_f^{(n)},P_f^{(n)}$ is output to the reverberation suppression unit 3.

The time-space covariance matrix estimation unit 2 estimates the time-space covariance matrix $R_f^{(n)},P_f^{(n)}$ based on, for example, the following equation:

$$R_f^{(n)} = \frac{1}{T}\sum_t \frac{\overline{X}_{t,f}\overline{X}_{t,f}^H}{\lambda_{t,f}^{(n)}} \in C^{M(L-D)\times m(L-D)} \quad \text{[Math. 2]}$$

$$P_f^{(n)} = \frac{1}{T}\sum_t \frac{\overline{X}_{t,f}X_{t,f}^H}{\lambda_{t,f}^{(n)}} \in C^{M(L-D)\times M} \quad \text{[Math. 3]}$$

$$-X_{t,f} \text{ is } -X_{t,f} = \left[X_{t-D,f}^T, \ldots, X_{t-L+1,f}^T\right]^T.$$

In the first processing, the time-space covariance matrix estimation unit 2 executes the processing using the power $\lambda_{t,f}^{(n)}$ of the sound source n, which has been initialized by the initialization unit 1. In the second processing and subsequent processing, the time-space covariance matrix estimation unit

2 executes the processing using the power $\lambda_{t,f}^{(n)}$ of the sound source n, which has been updated by the sound source separation unit 4.

<Reverberation Suppression Unit 3>

The time-space covariance matrix $R_f^{(n)}, P_f^{(n)}$ corresponding to each sound source n, estimated by the time-space covariance matrix estimation unit 2, and the observation signal vector $X_{t,f}$ composed of the observation signal $x_{m,t,f}$ from the microphone m are input to the reverberation suppression unit 3.

The reverberation suppression unit 3 obtains a reverberation removal filter $G_f^{(n)}$ of the sound source n using the time-space covariance matrix $R_f^{(n)}, P_f^{(n)}$, wherein n is any number from 1 to N, and generates a reverberation suppression signal vector $Z_{t,f}^{(n)}$ corresponding to the observation signal $x_{m,t,f}$, associated with an emphatic sound of the sound source n, using the obtained reverberation removal filter $G_f^{(n)}$ and the observation signal vector $X_{t,f}$ (step S3).

In other words, the reverberation suppression unit 3 generates reverberation suppression signal vectors $Z_{t,f}^{(1)}, \ldots, Z_{t,f}^{(N)}$ corresponding to the observational signal $x_{m,t,f}$, associated with empathic sounds of the sound sources 1, . . . , N, respectively. $Z_{t,f}^{(n)}$ is $[z_{1,t,f}^{(n)}, \ldots, z_{M,t,f}^{(n)}]$, m is any number from 1 to M, and $z_{m,t,f}^{(n)}$ is a reverberation suppression signal corresponding to the observation signal $x_{m,t,f}$, associated with the empathic sound of the sound source n.

The generated reverberation suppression signal vector $Z_{t,f}^{(n)}$ is output to the sound source separation unit 4.

The reverberation suppression unit 3 obtains the reverberation removal filter $G_f^{(n)}$ based on, for example, the following equation:

$$G_f^{(n)}=(R_f^{(n)})^{-1}P_f^{(n)} \quad \text{[Math. 4]}$$

Moreover, the reverberation suppression unit 3 obtains the reverberation suppression signal vector $Z_{t,f}^{(n)}$ based on, for example, the following equation:

$$Z_{t,f}^{(n)}=X_{t,f}-(G_f^{(n)})^H\overline{X}_{t,f} \quad \text{[Math. 5]}$$

<Sound Source Separation Unit 4>

The reverberation suppression signal vector $Z_{t,f}^{(n)}$, which has been generated by the reverberation suppression unit 3, is input to the sound source separation unit 4.

The sound source separation unit 4 obtains an emphatic sound $y_{t,f}^{(n)}$ of the sound source n and the power $\lambda_{t,f}^{(n)}$ of the sound source n, using the generated reverberation suppression signal vector $Z_{t,f}^{(n)}$, wherein n is any number from 1 to N (step S4).

In particular, the sound source separation unit 4 generates the separation filter $Q_f^{(n)}$ corresponding to the sound source n using the generated reverberation suppression signal vector $Z_{t,f}^{(n)}$, wherein n is any number from 1 to N; obtains the emphatic sound $y_{t,f}^{(n)}$ of the sound source n using the generated separation filter $Q_f^{(n)}$ and the generated reverberation suppression signal vector $Z_{t,f}^{(n)}$; and then, obtains the power $\lambda_{t,f}^{(n)}$ of the sound source n, using the obtained emphatic sound $y_{t,f}^{(n)}$.

The obtained emphatic sound $y_{t,f}^{(n)}$ of the sound source n is output from the acoustic signal enhancement device. The obtained power $\lambda_{t,f}^{(n)}$ of the sound source n is output to the time-space covariance matrix estimation unit 2.

An example of the processing in the sound source separation unit 4 will be described hereinbelow. The sound source separation unit 4 may obtain the emphatic sound $y_{t,f}^{(n)}$ of the sound source n and the power $\lambda_{t,f}^{(n)}$ of the sound source n with conventional methods other than a method to be described below.

In this example, the power $\lambda_{t,f}^{(n)}$ of the sound source n, which has been initialized by the initialization unit 1, is further input to the sound source separation unit 4.

The sound source separation unit 4 repeatedly executes (1) processing of obtaining a spatial covariance matrix $\Sigma_{Z,f}^{(n)}$ corresponding to the sound source n using the reverberation suppression signal vector $Z_{t,f}^{(n)}$ and the power $\lambda_{t,f}^{(n)}$ of the sound source n; (2) processing of updating the separation filter $Q_f^{(n)}$ corresponding to the sound source n using the obtained spatial covariance matrix $\Sigma_{Z,f}^{(n)}$, (3) processing of updating the emphatic sound $y_{t,f}^{(n)}$ of the sound source n using the updated separation filter $Q_f^{(n)}$ and the reverberation suppression signal vector $Z_{t,f}^{(n)}$; and (4) processing of updating the power $\lambda_{t,f}^{(n)}$ of the sound source n using the updated emphatic sound $y_{t,f}^{(n)}$, thereby finally obtaining the emphatic sound $y_{t,f}^{(n)}$ of the sound source n, wherein n is any number from 1 to N.

In other words, the sound source separation unit 4 repeatedly executes (1) processing of obtaining spatial covariance matrices $\Sigma_{Z,f}^{(1)}, \ldots, \Sigma_{Z,f}^{(N)}$ corresponding to the sound sources 1, . . . , N, respectively, using the reverberation suppression signal vectors $Z_{Z,f}^{(1)}, \ldots, Z_{Z,f}^{(N)}$ and the power $\lambda_{t,f}^{(1)}, \ldots, \lambda_{t,f}^{(N)}$ of the sound sources 1 to N; (2) processing of updating the separation filters $Q_f^{(1)}, \ldots, Q_f^{(N)}$ corresponding to the sound sources 1, . . . , N, respectively, using the obtained spatial covariance matrices $\Sigma_{Z,f}^{(1)}, \ldots, \Sigma_{Z,f}^{(N)}$; (3) processing of updating the emphatic sounds $y_{t,f}^{(1)}, \ldots, y_{t,f}^{(N)}$ of the sound sources 1, . . . , N, respectively, using the updated separation filters $Q_f^{(1)}, \ldots, Qf^{(N)}$ and the reverberation suppression signal vectors $Z_{t,f}^{(1)}, \ldots, Z_{t,f}^{(N)}$; and (4) processing of updating the powers $\lambda_{t,f}^{(1)}, \ldots, \lambda_{t,f}^{(N)}$ of the sound sources 1, . . . , N, respectively, using the updated emphatic sounds $y_{t,f}^{(1)}, \ldots, y_{t,f}^{(N)}$, thereby finally obtaining the emphatic sounds $y_{t,f}^{(1)}, \ldots, y_{t,f}^{(N)}$ of the sound sources 1, . . . , N, respectively.

The processing (1) to (4) need not be repeated. That is, the processing (1) to (4) may be performed only once in a single processing of step S4.

The finally obtained emphatic sound $y_{t,f}^{(n)}$ of the sound source n is output from the acoustic signal enhancement device. The finally updated power $\lambda_{t,f}^{(n)}$ of the sound source n is output to the time-space covariance matrix estimation unit 2.

The sound source separation unit 4 obtains the spatial covariance matrix $\Sigma_{Z,f}^{(n)}$ based on, for example, the following equation:

$$\sum\nolimits_{Z,f}^{(n)} = \frac{1}{T}\sum\nolimits_t Z_{t,f}^{(n)}\left(Z_{t,f}^{(n)}\right)^H/\lambda_{t,f}^{(n)} \quad \text{[Math. 6]}$$

The sound source separation unit 4 updates the separation filter $Q_f^{(n)}$ based on, for example, the following Equation (1) and (2). More specifically, it updates the separation filter $Q_f^{(n)}$ by plugging $Q_f^{(n)}$ obtained by Equation (1) into the right side of Equation (2) and calculating $Q_f^{(n)}$ defined by Equation (2).

[Math. 7]

$$Q_f^{(n)}=(W_f^H\Sigma_{Z,f}^{(n)})^{-1}e_n \quad (1)$$

[Math. 8]

$$Q_f^{(n)}=((Q_f^{(n)})^H\Sigma_{Z,f}^{(n)}Q_f^{(n)})^{-1/2}Q_f^{(n)} \quad (2)$$

n is any number from 1 to N, and $e_n$ is an N-dimensional vector wherein an n-th element is 1 and other elements are 0.

The sound source separation unit 4 updates the emphatic sound $y_{t,f}^{(n)}$ of the sound source n based on, for example, the following equation:

$$y_{t,f}^{(n)}=(Q_f^{(n)})^H Z_{t,f}^{(n)} \quad \text{[Math. 9]}$$

The sound source separation unit 4 updates the power $\lambda_{t,f}^{(n)}$ of the sound source n based on, for example, the following equation:

$$\lambda_t^{(n)}=\frac{1}{F}\sum_{f=0}^{F-1}|y_{t,f}^{(n)}|^2 \quad \text{[Math. 10]}$$

By feeding back the sound source separation results to the processing of the reverberation suppression unit 3 and repeating all the processing, the optimum processing can be achieved unlike the conventional method 1. Further, since it is not necessary to consider a relationship between sound sources for each sound source by estimating the time-space covariance matrix $R_f^{(n)},P_f^{(n)}$ for each sound source, the matrix required for optimization can has a greatly reduced size as compared to the conventional method 2. Therefore, the total calculation cost can be reduced.

Although the processing of the sound source separation unit 4 usually requires a large number of repetitions until convergence, the calculation cost of each repeated processing is smaller than that of the processing executed by the reverberation suppression unit 3. Therefore, convergence can be obtained at a smaller calculation cost by repeating the processing of the sound source separation unit 4 several times in each of the repeated processing. Thus, more flexible control can be achieved by setting the processing of the reverberation suppression unit 3 separately from the processing of the sound source separation unit 4.

<Control Unit 5>

A control unit 5 controls the repeated processing of the time-space covariance matrix estimation unit 2, the reverberation suppression unit 3, and the sound source separation unit 4 (step S5).

For example, the control unit 5 performs the repeated processing until a predetermined termination condition is satisfied. An example of the predetermined termination condition is that predetermined variables converge, such as the emphatic sound $y_{t,f}^{(n)}$ of the sound source n. Another example of the predetermined termination condition is that the number of times of repeated processing reaches a predetermined number of times.

[Modification]

While an embodiment of the present invention has been described above, specific configurations are not limited to the embodiment, and it will be appreciated that the present invention also encompasses modifications or alterations without departing from the spirit and the scope of the invention.

The various processing explained in the embodiment may not only be executed in chronological order according to the described sequences but may also be executed in parallel or individually in accordance with processing capability of a device to be used to execute the processing or as necessary.

For example, data may be directly exchanged between the constituent units of the acoustic signal enhancement device or may be exchanged via a storage unit (not illustrated).

[Program and Recording Medium]

Figure 3:
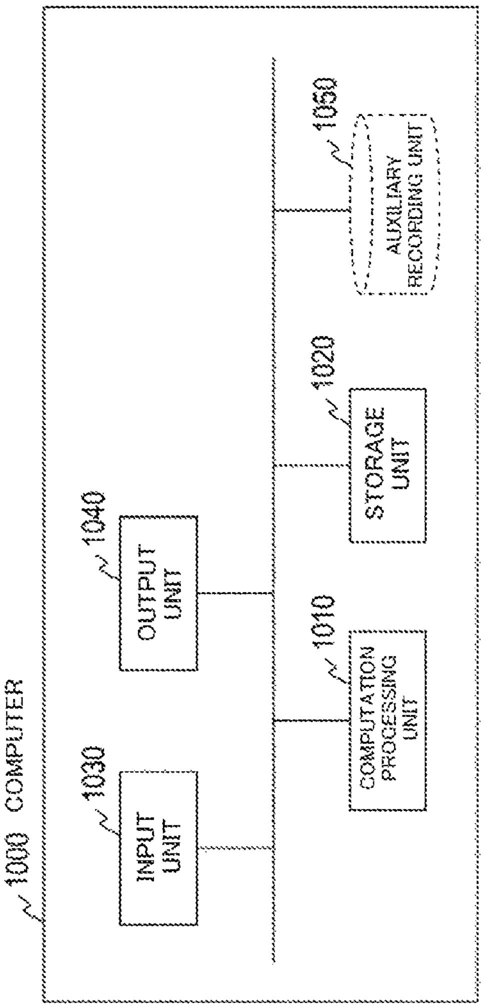
FIG. 3 is a diagram illustrating an example of a functional configuration of a computer.
Figure 4:
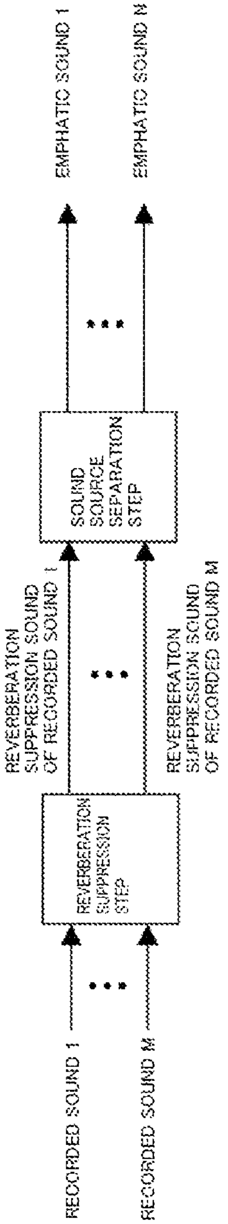
FIG. 4 is a diagram illustrating a configuration of a conventional method 1.
Figure 5:
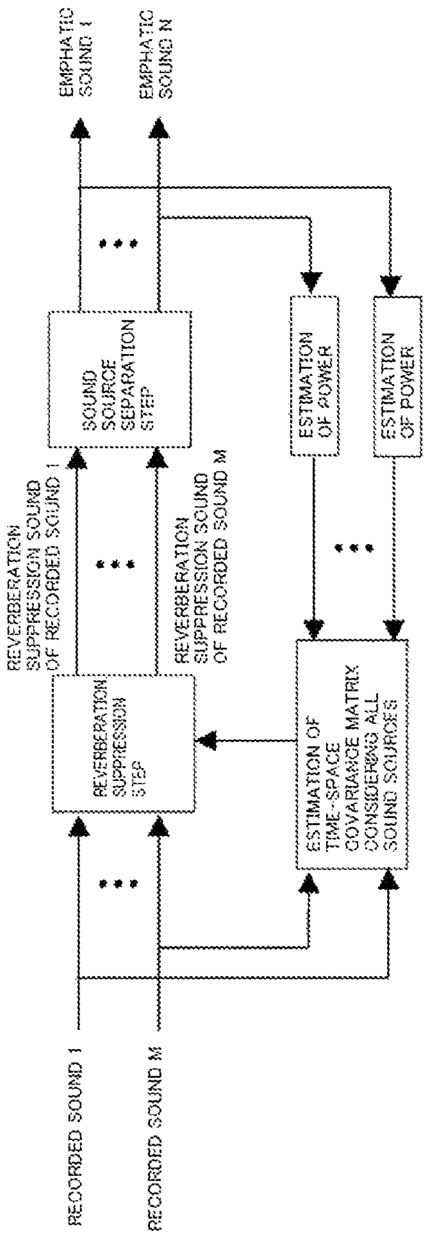
FIG. 5 is a diagram illustrating a configuration of a conventional method 2.

The processing of each unit of each device may be implemented by a computer, and in this case, the processing details of the functions that each device should have are described by a program. The various types of processing functions of each device are implemented on a computer, by causing this program to be loaded onto a storage unit 1020 of the computer 1000 shown in FIG. 3, and operating, for example, a computational processing unit 1010, an input unit 1030 and an output unit 1040.

The program describing the processing contents can be recorded on a computer-readable recording medium. The computer-readable recording medium is, for example, a non-transitory recording medium, and specifically, for example, a magnetic recording device or an optical disc.

The program is distributed, for example, by sales, transfer, or rent of a portable recording medium such as a DVD or a CD-ROM on which the program is recorded. In addition, the distribution of the program may be performed by storing the program in advance in a storage device of a server computer and transferring the program from the server computer to another computer via a network.

A computer executing such a program is configured to, for example, first, temporarily store a program recorded on a portable recording medium or a program transferred from a server computer in an auxiliary recording unit 1050 which is its own non-temporary storage device. When executing the processing, the computer reads the program stored in the auxiliary recording unit 1050 which is its own non-temporary storage device into the storage unit 1020, and executes the processing according to the read program. As another embodiment of the program, the computer may directly read the program from the portable recording medium into the storage unit 1020 and execute processing according to the program. Each time the program is transferred from the server computer to the computer, the processing according to the received program may be executed sequentially. In addition, the processing may be executed by means of a so-called application service provider (ASP) service which does not transfer a program from the server computer to the computer and implements processing functions only by execution instructions and acquisition of the results. It is assumed that the program in this embodiment includes data which is information to be provided for processing by an electronic computer and which is equivalent to a program (e.g. data that is not a direct command to the computer but has the property of defining the processing of the computer).

In this aspect, the device is configured by executing a predetermined program on a computer, but at least a part of the processing may be implemented by hardware.

In addition, changes, alterations or modifications can be made as appropriate without departing from the gist of the present invention.

The invention claimed is:

1. An acoustic signal enhancement device, comprising:

processing circuitry configured to implement:

an input unit configured to receive, from a microphone m of a sound source n, an observation signal $x_{m,t,f}$ as input;

a time-space covariance matrix estimation unit configured to estimate a time-space covariance matrix $R_f^{(n)},P_f^{(n)}$ corresponding to the sound source n, using a power $\lambda_{t,f}^{(n)}$ of the sound source n and an observation signal vector $X_{t,f}$ composed of the observation signal $x_{m,t,f}$ from the microphone m, wherein t denotes a time frame number, f denotes a frequency number, N denotes the number of sound sources, M denotes the number of microphones, n is any number from 1 to N, and m is any number from 1 to M;

a reverberation suppression unit configured to obtain a reverberation removal filter $G_f^{(n)}$ of the sound source n using the estimated time-space covariance matrix $R_f^{(n)}$, $P_f^{(n)}$, and to generate a reverberation suppression signal vector $Z_{t,f}^{(n)}$ corresponding to the observation signal $x_{m,t,f}$ for an emphasized sound of the sound source n using the obtained reverberation removal filter $G_f^{(n)}$ and the observation signal vector $X_{t,f}$;

a sound source separation unit configured to obtain an emphatic sound $y_{t,f}^{(n)}$ of the sound source n and the power $\lambda_{t,f}^{(n)}$ of the sound source n using the generated reverberation suppression signal vector $Z_{t,f}^{(n)}$;

a control unit configured to control repeated processing of the time-space covariance matrix estimation unit, the reverberation suppression unit, and the sound source separation unit, wherein the sound source separation unit is configured to repeatedly execute: (1) processing of obtaining a spatial covariance matrix $\Sigma_{Z,f}^{(n)}$ corresponding to the sound source n using the generated reverberation suppression signal vector $Z_{t,f}^{(n)}$ and the power $\lambda_{t,f}^{(n)}$ of the sound source n, (2) processing of updating a separation filter $Q_f^{(n)}$ corresponding to the sound source n using separation matrix $W_f=[Q_f^{(1)}, Q_f^{(2)}, \ldots, Q_f^{(N)}]^T \in C^{M\times N}$ and the obtained spatial covariance matrix $\Sigma_{Z,f}^{(n)}$, (3) processing of updating the emphatic sound $y_{t,f}^{(n)}$ of the sound source n using the updated separation filter $Q_f^{(n)}$ and the generated reverberation suppression signal vector $Z_{t,f}^{(n)}$ and (4) processing of updating the power $\lambda_{t,f}^{(n)}$ of the sound source n using the updated emphatic sound $y_{t,f}^{(n)}$, thereby finally obtaining the emphatic sound $y_{t,f}^{(n)}$ of the sound source n; and an output unit configured to convert the obtained emphatic sound $y_{t,f}^{(n)}$ of the sound source n into output data and to output the output data, wherein the output data indicate emphasis based on at least a part of the emphatic sound $y_{t,f}^{(n)}$ of the sound source n, and the output data further indicate suppressed reverberation of the at least a part of the emphatic sound $y_{t,f}^{(n)}$ of the sound source n.

2. An acoustic signal enhancement method, comprising:

input operation by an input unit, by receiving, from a microphone m of a sound source n, an observation signal $x_{m,t,f}$ as input;

time-space covariance matrix estimation by a time-space covariance matrix estimation unit, by estimating a time-space covariance matrix $R_f^{(n)}$, $P_f^{(n)}$) corresponding to the sound source n, using a power $\lambda_{t,f}^{(n)}$ of the sound source n and an observation signal vector $X_{t,f}$ composed of the observation signal $x_{m,t,f}$ from the microphone m, wherein t denotes a time frame number, f denotes a frequency number, N denotes the number of sound sources, M denotes the number of microphones, n is any number from 1 to N, and m is any number from 1 to M;

reverberation suppression by a reverberation suppression unit, by obtaining a reverberation removal filter $G_f^{(n)}$ of the sound source n using the estimated time-space covariance matrix $R_f^{(n)}$,$P_f^{(n)}$, and generating a reverberation suppression signal vector $Z_{t,f}^{(n)}$ corresponding to the observation signal $x_{m,t,f}$ for an emphasized sound of the sound source n using the obtained reverberation removal filter $G_f^{(n)}$ and the observation signal vector $X_{t,f}$;

sound source separation by a sound source separation unit, by obtaining an emphatic sound $y_{t,f}^{(n)}$ of the sound source n and the power $\lambda_{t,f}^{(n)}$ of the sound source n using the generated reverberation suppression signal vector $Z_{t,f}^{(n)}$;

by a control unit, controlling repeated processing of the time-space covariance matrix estimation, the reverberation suppression, and the sound source separation, wherein the sound source separation unit is configured to repeatedly execute: (1) processing of obtaining a spatial covariance matrix $\Sigma_{Z,f}^{(n)}$ corresponding to the sound source n using the generated reverberation suppression signal vector $Z_{t,f}^{(n)}$ and the power $\lambda t,f^{(n)}$ of the sound source n, (2) processing of updating a separation filter $Q_f^{(n)}$ corresponding to the sound source n using separation matrix $W_f=[Q_f^{(1)}, Q_f^{(2)}, \ldots, Q_f^{(N)}]^T \in C^{M\times N}$ and the obtained spatial covariance matrix $\Sigma_{Z,f}^{(n)}$, (3) processing of updating the emphatic sound $y_{t,f}^{(n)}$ of the sound source n using the updated separation filter $Q_f^{(n)}$ and the generated reverberation suppression signal vector $Z_{t,f}^{(n)}$, and (4) processing of updating the power $\lambda_{t,f}^{(n)}$ of the sound source n using the updated emphatic sound $y_{t,f}^{(n)}$, thereby finally obtaining the emphatic sound $y_{t,f}^{(n)}$ of the sound source n; and output by an output unit, by converting the obtained emphatic sound $y_{t,f}^{(n)}$ of the sound source n into output data and to output the output data, wherein the output data indicate emphasis based on at least a part of the emphatic sound $y_{t,f}^{(n)}$ of the sound source n, and the output data further indicate suppressed reverberation of the at least a part of the emphatic sound $y_{t,f}^{(n)}$ of the sound source n.

3. A non-transitory computer readable medium that stores a program for causing a computer to perform as each step of the acoustic signal enhancement method according to claim 2.

* * * * *